United States Patent [19]
Ross

[11] Patent Number: 4,593,343
[45] Date of Patent: Jun. 3, 1986

[54] ELECTROLYTIC CAPACITOR AND SPACER THEREFOR

[75] Inventor: Sidney D. Ross, Williamstown, Mass.

[73] Assignee: Sprague Electric Company, North Adams, Mass.

[21] Appl. No.: 668,053

[22] Filed: Nov. 5, 1984

[51] Int. Cl.⁴ .................. H01G 9/00; H01G 4/22; H01G 4/16

[52] U.S. Cl. ................................. 361/433; 361/319; 361/324

[58] Field of Search ............ 361/433, 315, 318, 319, 361/324; 423/432; 252/575

[56] References Cited

U.S. PATENT DOCUMENTS

| | | | |
|---|---|---|---|
| 2,757,140 | 7/1956 | Bush | 252/62.2 |
| 3,496,423 | 2/1970 | Ross | 361/433 |
| 3,539,306 | 11/1970 | Kumura et al. | 23/315 |
| 3,650,704 | 3/1972 | Kumura et al. | 23/315 |

FOREIGN PATENT DOCUMENTS 83-60527 4/1983 Japan.

OTHER PUBLICATIONS

Modern Plastics, Sep. 1983, pp. 59, 94.

*Primary Examiner*—L. T. Hix
*Assistant Examiner*—Douglas S. Lee

[57] ABSTRACT

An aluminum electrolytic capacitor has a wound foil section with cellulosic spacer material, interleaved between and contiguously wound with the foils, loaded with 1 to 6 wt % of a synthetic hydrotalcite. The spacer material may be Manila, Kraft or Benares paper.

4 Claims, 2 Drawing Figures

ELECTROLYTIC CAPACITOR AND SPACER THEREFOR

BACKGROUND OF THE INVENTION

This invention relates to a cellulosic electrolytic capacitor spacer material loaded with a synthetic hydrotalcite and to an aluminum electrolytic capacitor utilizing it.

The single most prevalent failure mode for aluminum electrolytic capacitors is the accidental inclusion or entry of chloride ion into the capacitor. The chloride ion, primarily as sodium chloride, is ubiquitous in our environment inasmuch as it is present in our skin, in the food we eat, and even, in some locations, in the air. Capacitor fabrication and assembly involve hand operations and are carried out in the ambient atmosphere. Even with great care and extensive precautions it is difficult to prevent 100% the accidental entry of chloride ion into the capacitor.

Another source of chloride contamination is in the electrolyte used. Some materials used as solutes involve chloride in their commercial synthesis. Even repeated recrystallization does not remove all traces of chloride. Also, the electrolytes are chemically active materials and can extract chloride from rubber and plastic parts of the capacitors, particularly sealing means. The foil itself is a possible source of chloride contamination as the foil is etched using chloride reagents. Even though the foil is cleaned after etching, some chloride may remain trapped in the etch structure.

The presence of chloride ion in an aluminun electrolytic capacitor, even in the parts per million range, can seriously impair the functioning of the electrolyte system and also cause extensive corrosion of the aluminum electrodes. A means or mechanism for neutralizing the adverse effect of chloride that makes its way into an aluminum capacitor is eminently desirable.

Heretofore, materials have been added to the electrolyte system to react preferentially with chloride ion to prevent corrosion of the aluminum electrodes. Additives have been incorporated into rubbers and plastics to nullify or tie-up residual chlorides present in them. Some of the materials used in the past pose toxicity and disposal problems, e.g., nitro- and azo-compounds.

SUMMARY OF THE INVENTION

It is an object of this invention to provide a spacer material loaded with a hydrotalcite and a capacitor containing such a spacer. It is a further object of this invention to provide a means of nullifying the effect of chloride ion, whatever its source, in an aluminum electrolytic capacitor.

Natural hydrotalcite is a rare carbonate mineral, $Mg_6Al_2(OH)16CO_3.4H_2O$, found in small deposits in the Urals and in Norway. It has the property of fixing and immobilizing the chloride ion in a stable crystal structure. While natural hydrotalcite is too rare to be useful for the present purpose, a synthetic hydrotalcite material, $Al_2O_3.6MgO.CO_2.12H_2O$, has been synthesized by Kyowa Chemical Industry Co., Ltd., Tokyo, Japan, and is marketed in the United States by Mitsui and Co., (U.S.A.) Inc., under the name DHT-4A. This synthetic hydrotalcite also can scavenge halogen, and it is described by Kumura et al in U.S. Pat. No. 3,539,306, issued Nov. 10, 1970, and in U.S. Pat. No. 3,650,704, issued Mar. 21, 1972, a continuation-in-part of the above.

This commercial product, hereinafter called synthetic hydrotalcite, is non-toxic, insoluble in water, oil, and electrolytic capacitor solvents. It has a mean particle size of 0.4 micrometers and its Brunauer-Emmett-Teller (BET) surface area is $10 \pm 5 m^2/g$. Data presented below show that the synthetic hydrotalcite is effective in overcoming adverse effects of chloride in the working electrolyte of the capacitor.

Addition of synthetic hydrotalcite to the seal or jacket material will not counteract these effects, and the material is not soluble enough to be added to the working electrolyte in the needed levels. It is therefore proposed to incorporate the synthetic hydrotalcite into the spacer paper used in the capacitor. In this way, the synthetic hydrotalcite would be in contact with the electrolyte and available to fix the chloride ion.

DESCRIPTION OF THE PREFERRED EMBODIMENTS

Figure 1:
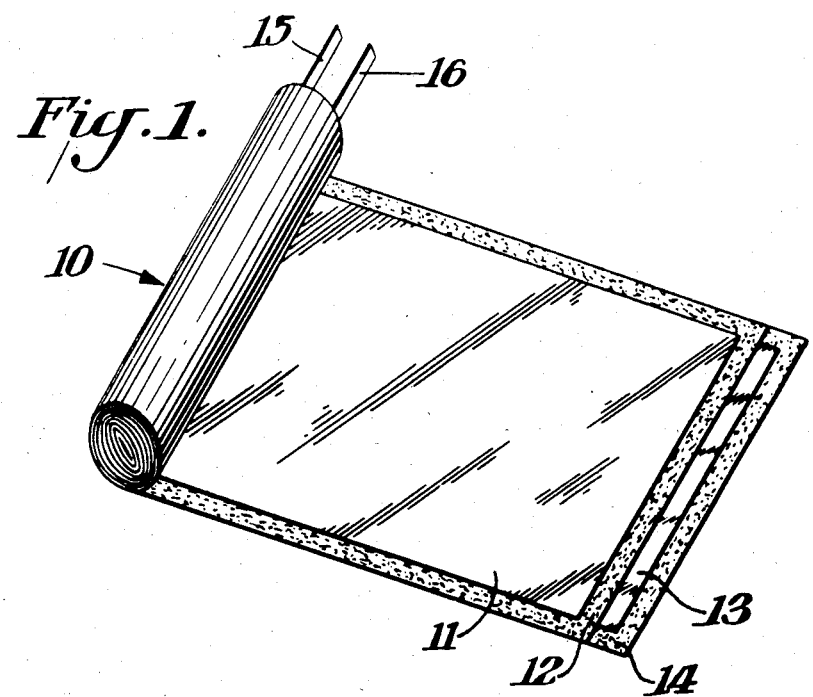
FIG. 1 shows a capacitor section partially unrolled.

An aluminum electrolytic capacitor section 10 has an aluminum anode foil electrode 11 which bears a layer of dielectric oxide and an aluminum cathode foil electrode 13 separated by and contiguously wound with cellulosic spacers 12 and 14 which are loaded or filled with synthetic hydrotalcite. Electrode tabs 15 and 16 are attached to anode foil 11 and cathode foil 13, respectively. Tabs 15 and 16 may extend from the same side of the section as shown in FIG. 1 or from opposite sides as shown in FIG. 2.

Figure 2:
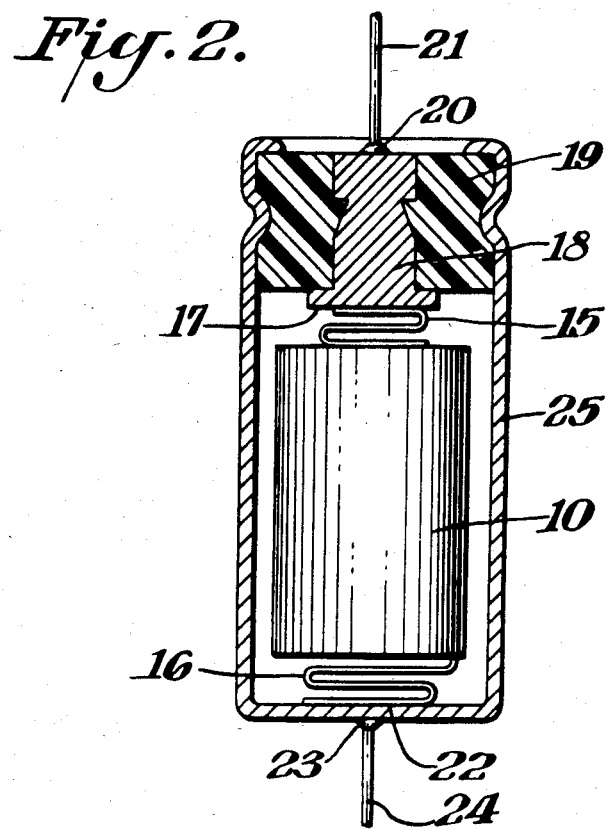
FIG. 2 is a cross-section of a finished capacitor.

In FIG. 2, rolled section 10 is housed in a metal casing 25 in the form of a can, preferably, aluminum. Tab 15 is connected at 17, preferably by a weld, to the bottom of metal terminal insert 18 which passes through elastomeric bung 19. External anode lead 21 is attached to the exterior top surface of insert 18 via weld 20.

Similarly, tab 16 is attached to the interior bottom of can 25 at 22, and exterior cathode lead 24 is attached to the outside bottom of can 25 via weld 23. Section 10 is impregnated with electrolyte.

Spacers 12, 14 are typically Manila, Benares, or Kraft papers and are wound with the foils 11, 13 to form a tightly wound cylindrical section 10. Normally, section 10 is wound and then impregnated with electrolyte.

In the following examples the effect of chloride ion in the parts per million level on working electrolytes and the effectiveness of synthetic hydrotalcite in nullifying these effects are shown.

EXAMPLE 1

This example shows the effect of small amounts of chloride ion on the functioning of both anodization electrolytes (water as solvent) and capacitor electrolytes (glycol as solvent). Electropolished aluminum foil was anodized to 100 V at 90° C. and 1.0 $mA/cm^2$ constant current in each electrolyte. Electrolyte A contains 20 g/l sodium dihydrogen phosphate in water; B contains 50 g/l of the same reagent in water; C contains 25 g/l of ammonium salicylate in water; D contains 11 wt % ammonium salicylate in glycol containing 1 wt % water; E contains 25 wt % of this reagent in glycol with 1 wt % water and, F contains 17 wt % ammonium pentaborate in glycol. Electrolyte resistivity at 25° C. in ohm-cm, maximum anodization voltage (V max) in volts, and formation rate (V/min) to reach 100 V at 90° C. are given.

TABLE 1

| Electrolyte | Cl$^-$, ppm | Ω-cm | Vmax | V/min |
|---|---|---|---|---|
| A | 0 | 108 | 154 | 16.0 |
|   | 20 | 108 | 49 | 11.5 |
| B | 0 | 60 | 109 | 15.5 |
|   | 90 | 60 | 50 | 16.0 |
| C | 0 | 74.5 | 198 | 20.6 |
|   | 10 | 74.5 | 17 | 19.4 |
| D | 0 | 300 | 132 | 24.2 |
|   | 50 | 300 | 74 | 24.5 |
| E | 0 | 220 | 162 | 25.1 |
|   | 50 | 220 | 125 | 25.1 |
| F | 0 | 950 | 330 | 21.1 |
|   | 20 | 950 | 284 | 21.8 |
|   | 50 | 950 | 230 | 21.8 |
|   | 100 | 950 | 128 | 20.7 |
|   | 125 | 950 | 115 | 15.4 |
|   | 150 | 950 | 104 | 13.5 |

Electrolyte resistivity was unaffected, formation rate was affected somewhat, but the effect of chloride on the ability to form or reform barrier layer oxide (Vmax) was disastrous. In every case not only was Vmax lowered but also there was corrosive attack on the aluminum foil. For any given electrolyte system (A and B, D and E), the higher the resistivity the worse the effect of chloride ion. Since working electrolytes have resistivities ranging from 150 to 1500 Ω-cm, the data indicate that the higher resistivity electrolytes used in higher voltage capacitors are more susceptible to effects of chloride ion than lower resistivity electrolytes for low voltage capacitors.

EXAMPLE 2

In this example, 50 ppm chloride were added to electrolyte F of Example 1. The data below show the effect of this level of chloride ion and the effect of varying amounts of synthetic hydrotalcite. Again, electropolished foil was anodized at 90° C. to 150 V and to the maximum anodization voltage at 1.0 mA/cm$^2$. Criteria used to judge formation quality were leakage current (in mA) after 15 min at 150 V and Vmax in volts. The rate in V/min to reach 150 V is given also. The synthetic hydrotalcite used was DHT-4A available from Mitsui as noted above.

TABLE 2

| Additive | Rate to 150 V V/min | Leakage ma | Vmax Volts |
|---|---|---|---|
| None | 24.6 | 0.91 | 330 |
| 50 ppm Cl$^-$ | 24.0 | 6.3 | 230 |
| 1000 ppm DHT-4A | 24.0 | 0.96 | 327 |
| 1000 ppm DHT-4A + 50 ppm Cl$^-$ | 24.0 | 5.1 | 235 |
| 2000 ppm DHT-4A + 50 ppm Cl$^-$ | 24.0 | 1.1 | 255 |
| 3000 ppm DHT-4A + 50 ppm Cl$^-$ | 23.4 | 1.0 | 268 |
| 6000 ppm DHT-4A + 50 ppm Cl$^-$ | 23.4 | 1.0 | 300 |

Leakage current was almost restored by 2000 ppm of synthetic hydrotalcite, but Vmax was not restored to almost its original value until 5000-6000 ppm were used. It is important that the synthetic hydrotalcite did not itself impair electrolyte properties (neither leakage current or Vmax were significantly changed by 1000 ppm DHT-4A alone).

EXAMPLE 3

Koywa Chemical Industry's literature suggests a quasi-ion-exchange mechanism in which two chloride ions replace a carbonate ion in the synthetic mineral. Purging the material of chloride is said to require a temperature of 450° C. or above. However, the synthetic hydrotalcite did not seem to be functioning as a mixed bed cation and anion exchange resin with the electrolyte of Example 2. If it did, then it would be expected that the conducting solutes of the electrolyte would be exchanged and replaced by water, decreasing solute concentration and lowering electrolyte resistivity. This did not happen.

In a more severe experiment, 200 ml of an electrolyte containing 7.3% diammonium adipate, 4.9% p-nitrobenzoic acid, and 87.8% ethylene glycol was stored for 2.5 hrs. with 10 g of DHT-4A. The electrolyte resistivity remained unchanged at 377 Ω-cm, while Vmax decreased slightly from 265 V to 233 V and the formation rate remained at 17.5 V/min. However the synthetic hydrotalcite fixes chloride in electrolytes, it does not appear to be by a simple ion-exchange mechanism.

Because the synthetic hydrotalcite is virtually insoluble in electrolyte solvents, it cannot be added to a capacitor in the usual manner. Dispersing it in the electrolyte is not the answer, as capacitor sections are impregnated as tightly wound sections, and the hydrotalcite would not penetrate into the section where it is needed.

However, the paper spacers used in capacitors are made with considerable open free volume and are made to be fully pervious to liquids to minimize the equivalent series resistance of the final capacitor. If the paper spacer were loaded with the synthetic hydrotalcite, it would be present in the wound section where it would be available to the electrolyte.

The loading or filling of paper with clay and other water insoluble inorganic materials is well-known. Loadings as high as 40% calcium carbonate and 20% of diatomaceous earth or titanium oxide are known and described in paper-making art. For example, see *Pulp and Paper Manufacture Volume 2 Preparation of Stock for Paper Making,* J. Newell Stephenson, Editor-in-Chief, McGraw Hill, N.Y. 1951, chapter 4, "Fillers and Loading", H. C. Schwalbe.

Like clay, the synthetic hydrotalcite can be added to the pulp slurry as a beater additive before forming the paper sheets, pressing and drying.

It may be added dry to the pulp stock in which it is dispersed by the beater. Alternatively, it is added as an aqueous dispersion early in the beating cycle to facilitate even mixing and distribution in the pulp.

The 1-6 wt % hydrotalcite which would be required to scavenge trace amounts of chloride which makes its way into the capacitor is easily achieved. More than 6% is unnecessary at the chloride levels most likely to be encountered, and unnecessarily filing the pores of the paper spacer is undesirable.

What is claimed is:

1. An aluminum electrolytic capacitor comprising a rolled foil section having an electrode foil anode bearing a barrier layer dielectric oxide on its surface, an electrode foil cathode, said anode and said cathode being contiguously wound with interleaved spacer material, said spacer material being a cellulosic material which is pulp loaded with 1 to 6 wt % synthetic hydrotalcite and being in contact with an electrolytic capacitor electrolyte.

2. A capacitor according to claim 1 wherein said cellulosic spacer is selected from the group consisting of Manila, Benares and Kraft paper spacers.

3. A capacitor according to claim 1 wherein said anode foil and said cathode foil are aluminum.

4. A cellulosic spacer material for an electroytic capacitor comprising a cellulosic material selected from the group consisting of Manila, Benares and Kraft paper materials which is pulp loaded with 1 to 6 wt % of a synthetic hydrotalcite.

* * * * *